(12) United States Patent
Xiao et al.

(10) Patent No.: US 11,563,658 B2
(45) Date of Patent: Jan. 24, 2023

(54) CABLE MODEM TERMINATION SYSTEM

(71) Applicant: ARRIS Enterprises LLC, Suwanee, GA (US)

(72) Inventors: Jing Xiao, Shenzhen (CN); Xuebo Chen, Shenzhen (CN); Wei Lu, Shenzhen (CN); Jing Sun, Shenzhen (CN); Zhiyong Dong, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/681,355

(22) Filed: Feb. 25, 2022

(65) Prior Publication Data

US 2022/0311688 A1    Sep. 29, 2022

(30) Foreign Application Priority Data

Feb. 25, 2021   (CN) .......................... 202110210567.1
Feb. 25, 2021   (CN) .......................... 202110210629.9

(51) Int. Cl.
| | | |
|---|---|---|
| *H04L 43/0811* | (2022.01) | |
| *H04L 12/28* | (2006.01) | |
| *H04L 43/0823* | (2022.01) | |
| *H04L 41/0681* | (2022.01) | |
| *H04L 43/16* | (2022.01) | |

(52) U.S. Cl.
CPC ...... *H04L 43/0811* (2013.01); *H04L 12/2801* (2013.01); *H04L 12/2898* (2013.01); *H04L 41/0681* (2013.01); *H04L 43/0823* (2013.01); *H04L 43/16* (2013.01)

(58) Field of Classification Search
CPC ............. H04L 43/0811; H04L 12/2801; H04L 12/2898; H04L 41/0681; H04L 43/0823; H04L 43/16
See application file for complete search history.

(56) References Cited

U.S. PATENT DOCUMENTS

| | | | |
|---|---|---|---|
| 2002/0056132 A1 | 5/2002 | Wilson | |
| 2002/0144284 A1 | 10/2002 | Burroughs et al. | |
| 2003/0110250 A1* | 6/2003 | Schnitzer | H04L 41/22 709/224 |
| 2010/0154017 A1 | 6/2010 | An et al. | |
| 2011/0320634 A1* | 12/2011 | Yang | H04L 41/0896 375/222 |
| 2017/0063669 A1* | 3/2017 | Walston | H04L 41/0672 |
| 2018/0249986 A1* | 9/2018 | Lee | A61B 8/54 |
| 2021/0352354 A1* | 11/2021 | Gilson | H04N 21/41265 |

OTHER PUBLICATIONS

International Search Report and Written Opinion Re: Application No. PCT/US2022/017995, dated May 31, 2022.

* cited by examiner

*Primary Examiner* — Arvin Eskandarnia
*Assistant Examiner* — Chhian (Amy) Ling
(74) *Attorney, Agent, or Firm* — Chernoff, Vilhauer, McClung & Stenzel, LLP

(57) ABSTRACT

A system, in one embodiment, includes a cable modem termination system configured to perform at least the following processing: determining a first quantity related to uncorrectable erroneous codewords and a second quantity related to other codewords except the erroneous codewords in the data packet received by the cable modem termination system from the terminal device via the channel; calculating a first metric relating the first quantity to the second quantity; and in response to the first metric exceeding a first threshold for a first predetermined time, determining the channel as a damaged channel.

6 Claims, 8 Drawing Sheets

900

S910 — For a plurality of test codewords received by a modem from a local end device through a damaged channel, the modem determines a third quantity related to uncorrectable erroneous test codewords and a fourth quantity related to test codewords other than the erroneous test S920 — The modem calculates a second metric relating the third quantity to the fourth quantity S930 — In response to determining that the second metric is lower than a second threshold for a second predetermined time, the modem determines that the damaged channel is recovered to be usable

Figure 9

CABLE MODEM TERMINATION SYSTEM

CROSS REFERENCE TO RELATED APPLICATIONS

This application claims the benefit of China Patent Application Serial Number 202110210629.9 filed Feb. 25, 2021 and China Patent Application Serial Number 202110210567.1 filed Feb. 25, 2021.

BACKGROUND

The present disclosure relates to the field of cable modem termination systems, and in particular to communications between terminal devices to cable modem termination systems, and the disclosure further relates to the field of network communication, and more specifically, to a method, a medium, a program product, and/or a modem for detecting channel state in the field of network communication.

A cable modem (CM) is a device that can access data through a cable TV network. The CM, when connected between a cable socket in the user's home and a network device (such as a computer), for example, sends data packets from the internet device (such as a personal computer (PC), VoIP phone, video IP device, etc.) to a cable modem termination system (CMTS).

The CMTS receives data packets from the CM and sends them to the corresponding network elements. In addition, the CMTS obtains the data required by the user's internet access device from the corresponding network element, and sends the data to the CM, and the CM provides the data from the CMTS to the network device.

In the communication between the CMTS and the CM, the direction of communication from the CM to the CMTS is called the upstream direction, and the channel used to transmit data in the upstream direction is called the upstream channel; the direction of communication from the CMTS to the CM is called the downstream direction, and the channel used to transmit data in the downstream direction is called the downstream channel.

In a communication network with cable transmission, such as a DOCSIS (Data Over Cable Service Interface Specifications) network, signals transmitted in the cable may be affected by various interference sources. For example, in a cable between a CMTS (Cable Modem Termination System) as a local end device and a modem as a user side access device, signal transmission may be interfered by LTE signals, WCDMA signals, QAM signals or analog signals, etc. These interference signals as noise will lower channel quality, making it difficult for transmission signals including control messages and user data to be received and decoded normally. As a result, the communication between the CMTS and the modem cannot be performed normally.

Due to the influence of noise, physical layer/medium access control layer control messages (hereinafter referred to as PHY/MAC control messages for short) such as SYNC (Synchronization) messages, MDD (MAC Domain Descriptor, Medium Access Control Domain Descriptor) messages, and FEC (Forward Error Correction) signals sent by the CMTS to the modem may not be correctly received and decoded by the modem, resulting in the loss of the PHY/MAC control messages. After the PHY/MAC control message has been lost for a certain period of time, the modem can determine that it is damaged from the CMTS to its downlink channel, so that the downlink channel is no longer used. In some cases, the noise level fluctuates continuously within a certain range. This may cause the PHY/MAC control message to be temporarily lost, then correctly received and locked by the modem before the aforementioned time period is reached, then temporarily lost again, and then correctly received and locked by the modem again, and so on, making the PHY/MAC control message continuously flap (flapping).

The flapping of the PHY/MAC control message means that the channel quality of the corresponding channel is poor, and the channel is no longer suitable for transmitting data. More seriously, the data sent by the CMTS to the modem will be fragmented and transmitted together on a plurality of channels between the CMTS and the modem, and thus the modem needs to decode them together based on the fragmented data transmitted on the plurality of channels to obtain packet data. The fragmented data transmitted on the channel on which the PHY/MAC control message is constantly flapping have a high codeword error rate, and thus, when they are decoded together with correct fragmented data on other channels, it is impossible to obtain the correct packet data, resulting in a rapid decrease in downstream throughput.

In the current related art, only the flapping of a specific PHY/MAC control message (i.e., FEC message) in the primary channel between the CMTS and the modem is detected. The modem determines that the FEC message is in a flapping state by recording the number of times the FEC message in the primary channel is lost and locked within a predetermined time, and stops using the primary channel when the flapping state is detected. The plurality of channels existing between the CMTS and the modem can be divided into primary channels and non-primary channels. User data can be transmitted on both the primary channels and the non-primary channels. There is usually one primary channel, and the CMTS sends management information including control information, configuration information, etc., for managing the modem to the modem through the primary channel. Since the modem only focuses on the flapping of the FEC message in the primary channel, the modem cannot know whether other PHY/MAC control messages in the primary channel and all types of PHY/MAC control messages in the non-primary channels are flapping or not. This makes it impossible for the modem to realize that the quality of the corresponding channel is lowered even if the aforementioned flapping occurs, and thus the modem will continue to transmit data on the channel with poor channel quality, resulting in a decrease in downstream throughput.

Therefore, in order to overcome the aforementioned problem that the modem cannot correctly identify the channel state in all situations, it is desirable to provide a way to enable the modem to correctly detect the channel state, regardless of the type of the channel and the type of the control message.

SUMMARY OF THE INVENTION

In some cases, due to the presence of noise, interference, etc., the upstream channel from the CM to the CMTS may become unavailable, and thus be marked as a damaged channel by the CMTS. One method for detecting whether the upstream channel is damaged is by sending a MAC (media access control) message (such as a range request message, RNG-REQ) from the CMTS to the CM and monitoring whether a response (such as a range response message, RNG-RSP) to the MAC message from the CMTS is received from the CM. When the CMTS does not receive a response to the MAC message from the CM after a certain period of time, that is when the MAC message times out (MAC message timeout), the CMTS will consider the upstream channel to be unavailable and mark the channel as a damaged channel. The CMTS can send the message that the upstream channel is a damaged channel to the CM, so that the CM does not use the upstream channel to send data packets. In this way, it can be ensured that data packets from the CM are not transmitted on the damaged channel.

When a certain upstream channel is affected by interference signals (such as LTE signals, QAM signals, analog signals, etc.) and channel quality is poor but is not bad enough that the CMTS will mark it as a damaged channel, the data packets transmitted on the channel will be interfered and the throughput of the entire upstream data will be affected.

For example, when a data packet transmitted on an upstream channel has a low signal-to-noise ratio due to interference, the CMTS may not be able to correctly decode some codewords in the data packet, and this results in uncorrectable erroneous codewords being produced. In the case of a large number of uncorrectable erroneous codewords, the entire packet may not be decoded correctly. In this case, if the protocol allows the retransmission of the data packet, the data packet needs to be retransmitted; if the protocol does not allow the retransmission of the data packet, the information carried by the data packet will be lost.

Therefore, if the channel quality of the upstream channel is poor and if data continues to be transmitted on such an upstream channel, the throughput of the upstream channel may decrease, thereby affecting the efficiency of data transmission.

The present disclosure is made in view of the aforementioned problems, and provides a cable modem termination system and its method, medium and computer program product, which can detect the channel quality based on the status of the codewords in the data packet transmitted on the upstream channel, and verify whether to determine the upstream channel as a damaged channel. In this manner, data packet loss can be reduced and the throughput rate of the upstream channel can be improved.

According to one aspect, a cable modem termination system is provided, and the cable modem terminal system includes: a memory on which instructions are stored; and a processor configured to execute instructions stored on the memory to perform at least the following processing: determining a first quantity related to uncorrectable erroneous codewords and a second quantity related to other codewords except the erroneous codewords in the data packet received by the cable modem termination system from the terminal device via the channel; calculating a first metric relating the first quantity to the second quantity; and in response to the first metric exceeding a first threshold for a first predetermined time, determining the channel as a damaged channel.

In some embodiments, the processor is further configured to execute instructions stored on the memory to perform at least the following processing: in response to the determination that the channel is a damaged channel, send a message to the terminal device to prevent the terminal device from sending data packets to the cable modem termination system on the channel.

In some embodiments, the first quantity related to uncorrectable erroneous codewords is the number of uncorrectable erroneous codewords, and the second quantity related to codewords other than the erroneous codewords is the number of correct codewords after error correction processing, the first metric is a ratio of the first quantity to the second quantity or a ratio of the first quantity to a sum of the first quantity and the second quantity.

In some embodiments, the processor is further configured to execute instructions stored on the memory to perform at least the following processing: determining a third quantity related to uncorrectable erroneous test codewords and a fourth quantity related to other test codewords except the erroneous test codewords in the test data received by the cable modem termination system from the terminal device via the channel; calculating a second metric relating the third quantity to the fourth quantity; and in response to the second metric being lower than the second threshold for a second predetermined time, determining the channel as an available channel.

In some embodiments, the processor is further configured to execute instructions stored on the memory to perform at least the following processing: in response to the determination that the channel is a damaged channel, send a message to the terminal device for causing the terminal device to send test data on the channel.

In some embodiments, the third quantity related to uncorrectable erroneous test codewords is the number of uncorrectable erroneous test codewords, and the fourth quantity related to test codewords other than the erroneous test codewords is the number of correct test codewords after error correction processing, the second metric is a ratio of the third quantity to the fourth quantity or a ratio of the third quantity to a sum of the third quantity and the fourth quantity.

In some embodiments, the second predetermined time is greater than the first predetermined time.

In some embodiments, the first threshold is higher than the second threshold, and the second threshold is not higher than 1%.

In some embodiments, at least one of the first threshold, the second threshold, the first predetermined time, and the second predetermined time is defined in a management information base (MIB).

According to another aspect of the present disclosure, a method for a cable modem termination system is provided, and the method includes: determining a first quantity related to uncorrectable erroneous codewords and a second quantity related to other codewords except the erroneous codewords in the data packet received by the cable modem termination system from the terminal device via the channel; calculating a first metric relating the first quantity to the second quantity; and in response to the first metric exceeding a first threshold for a first predetermined time, determining the channel as a damaged channel.

In some embodiments, the method further includes: in response to the determination that the channel is a damaged channel, send a message to the terminal device to prevent the terminal device from sending data packets to the cable modem termination system on the channel.

In some embodiments, the method further includes: determining a third quantity related to uncorrectable erroneous test codewords and a fourth quantity related to other test codewords except the erroneous test codewords in the test data received by the cable modem termination system from the terminal device via the channel; calculating a second metric relating the third quantity to the fourth quantity; and in response to the second metric being lower than the second threshold for a second predetermined time, determining the channel as an available channel.

According to another aspect of the present disclosure, a non-transitory computer-readable medium is provided, wherein the non-transitory computer-readable medium has instructions stored thereon, which, when executed by the processor, perform at least the following processing: determining a first quantity related to uncorrectable erroneous codewords and a second quantity related to other codewords except the erroneous codewords in the data packet received by the cable modem termination system from the terminal device via the channel; calculating a first metric relating the first quantity to the second quantity; and in response to the first metric exceeding a first threshold for a first predetermined time, determining the channel as a damaged channel.

In some embodiments, the instructions, when executed by the processor, also perform at least the following processing: in response to the determination that the channel is a damaged channel, send a message to the terminal device to prevent the terminal device from sending data packets to the cable modem termination system on the channel.

In some embodiments, when executed by the processor, the instructions also perform at least the following processing: determining a third quantity related to uncorrectable erroneous test codewords and a fourth quantity related to other test codewords except the erroneous test codewords in the test data received by the cable modem termination system from the terminal device via the channel; calculating a second metric relating the third quantity to the fourth quantity; and in response to the second metric being lower than the second threshold for a second predetermined time, determining the channel as an available channel.

Some aspects of the present disclosure relate to a modem. The modem may include: a memory, in which an instruction is stored; and a processor, configured to execute the instruction stored in the memory to cause the modem to execute the following operations. The operations include: for a plurality of codewords received by the modem from a local end device through a channel, determining a first quantity related to uncorrectable erroneous codewords and a second quantity related to codewords other than the erroneous codewords; calculating a first metric relating the first quantity to the second quantity; and determining that the channel is damaged in response to determining that the first metric exceeds a first threshold for a first predetermined time.

In some embodiments, in response to determining that the channel is damaged, the modem may send to the local end device a message for preventing the local end device from sending user data on the channel.

In some embodiments, in response to determining that the channel is damaged, the modem may add the channel to a blacklist to avoid using the channel as a channel for transmitting management information for managing the modem therethrough.

In some embodiments, the first quantity related to uncorrectable erroneous codewords may be the number of uncorrectable erroneous codewords, the second quantity related to codewords other than the erroneous codewords may be the number of correct codewords after error correction processing, and the first metric may be a ratio of the first quantity to the second quantity or a ratio of the first quantity to a sum of the first quantity and the second quantity.

In some embodiments, when the channel is a channel through which the local end device transmits management information for managing the modem, in response to determining that the channel is damaged, the modem may re-establish a connection between the local end device and the modem.

In some embodiments, when the channel is not the channel through which the local end device transmits management information for managing the modem, for a plurality of test codewords received by the modem from a local end device through the channel, the modem may determine a third quantity related to uncorrectable erroneous test codewords and a fourth quantity related to test codewords other than the erroneous test codewords; calculate a second metric relating the third quantity to the fourth quantity; and determine that the channel is usable in response to determining that the second metric is lower than a second threshold for a second predetermined time.

In some embodiments, the second predetermined time is greater than the first predetermined time, the first threshold is higher than the second threshold, and the second threshold is 2% or lower.

Other aspects of the present disclosure relate to a method, a non-transitory computer-readable medium, and a computer program product for setting a modulation mode. They all can realize the operations that can be executed by the modem.

According to another aspect of the present disclosure, a computer program product is provided, including a computer program, which, when executed by a processor, implements the method according to an embodiment of the present disclosure.

BRIEF DESCRIPTION OF THE DRAWINGS

For a better understanding of the invention, and to show how the same may be carried into effect, reference will now be made, by way of example, to the accompanying drawings, in which:

FIG. 9 illustrates a flowchart of a method for determining recovery of a damaged non-primary channel according to an embodiment of the present disclosure.

FIG. 11 is a schematic diagram of an example of detecting a channel state using a method according to an embodiment of the present disclosure.

DETAILED DESCRIPTION

Figure 1:
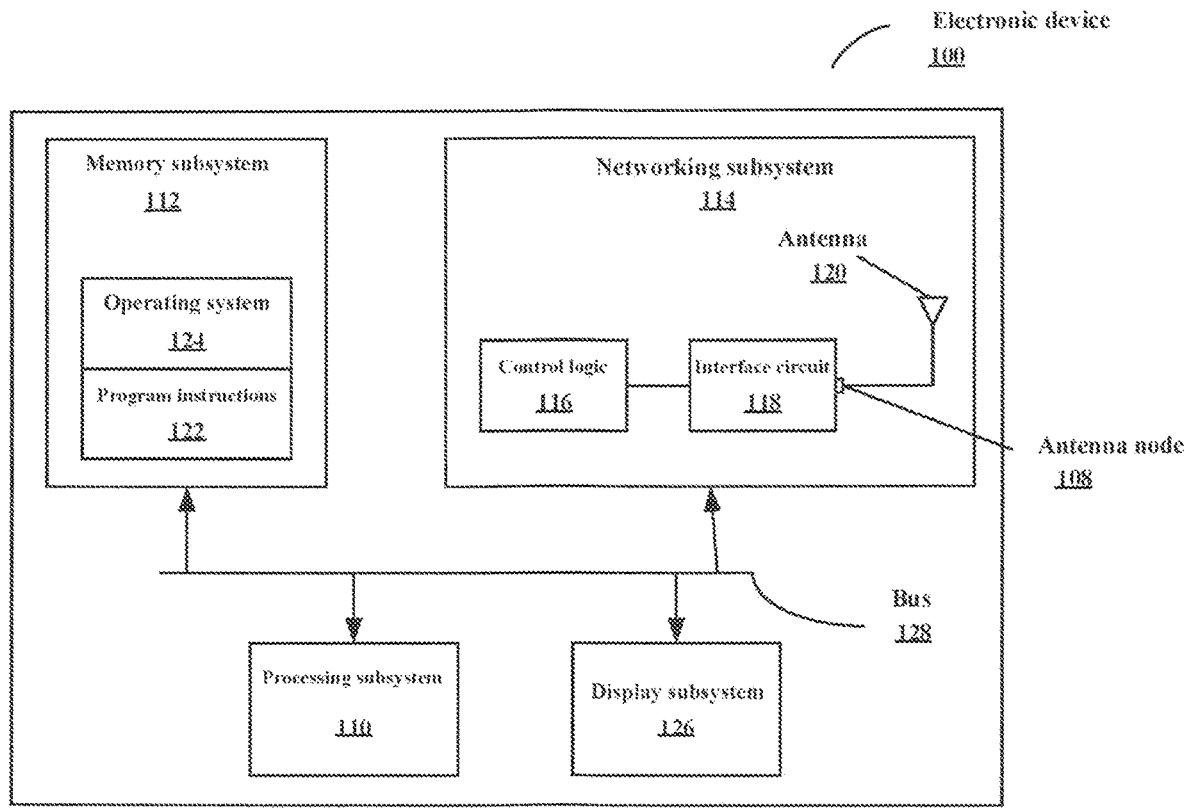
FIG. 1 illustrates an exemplary configuration of an electronic device that can realize an embodiment of the present disclosure.

FIG. 1 shows an exemplary configuration of an electronic device 100 that can realize an embodiment according to the present disclosure. For example, the electronic device 100 may be used to realize a CMTS according to an embodiment of the present disclosure. As shown in FIG. 1, the electronic device 100 includes a processing subsystem 110, a memory subsystem 112, and a networking subsystem 114.

The processing subsystem 110 can be configured to execute instructions stored on the memory subsystem 112 to implement operations performed by the CMTS as herein. The processing subsystem 110 may include one or a plurality of devices configured to perform computing operations. For example, the processing subsystem 110 may comprise one or a plurality of microprocessors, ASICs, microcontrollers, programmable logic devices, graphics processing units (GPUs) and/or one or more digital signal processors (DSPs).

The memory subsystem 112 comprises one or a plurality of devices for storing data and/or instructions used for the processing subsystem 110 and the networking subsystem 114. For example, the memory subsystem 112 may include a dynamic random-access memory (DRAM), static random-access memory (SRAM), and/or other types of memory (sometimes collectively or individually referred to as "computer-readable storage medium").

In addition, the memory subsystem 112 may include a mechanism for controlling access to the memory. In some embodiments, the memory subsystem 112 includes a memory hierarchy that includes one or a plurality of caches coupled to the memory in the electronic device 100. In some of these embodiments, one or a plurality of the caches are located in the processing subsystem 110.

In some embodiments, the memory subsystem 112 is coupled to one or a plurality of high-capacity mass storage devices (not shown). For example, the memory subsystem 112 may be coupled to a magnetic or an optical driver, a solid-state driver, or another type of mass storage device. In these embodiments, the electronic device 100 may use the memory subsystem 112 as a fast-access storage of frequently used data, while the mass storage device is used for storing infrequently used data.

The networking subsystem 114 comprises one or a plurality of devices that are configured to be coupled to and/or communicate over wired and/or wireless networks (i.e., to execute network operations), comprising: control logic 116, interface circuit 118, and one or a plurality of antennas 120 (or antenna elements). Although FIG. 1 includes one or a plurality of antennas 120, in some embodiments, the electronic device 100 includes one or a plurality of nodes, such as node 108, for example, a soldered node, that can be coupled to the one or the plurality of antennas 120. Therefore, the electronic device 100 may include or may not include one or a plurality of antennas 120. For example, the networking subsystem 114 may comprise a Bluetooth networking system, a cellular networking system (for example, 3G/4G/5G networks, such as UMTS and LTE, etc.), a USB networking system, a networking system based on standards described in IEEE 802.11 (for example, Wi-Fi networking system), Ethernet networking system, and/or another networking system.

In the electronic device 100, a bus 128 is used to couple the processing subsystem 110, the memory subsystem 112, and the networking subsystem 114 together. The bus 128 may comprise electrical, optical, and/or electro-optical connections of the subsystems through which commands, data and the like may be transmitted. Although only one bus 128 is shown for clarity, different embodiments may comprise electrical, optical, and/or electro-optical connections of different numbers or configurations among the subsystems.

In some embodiments, the electronic device 100 includes a display subsystem 126 for showing information on a display device, which may include a display driver and a display, such as a liquid crystal display and a multi-touch screen, etc.

The electronic device 100 may be (or may be included in) any electronic device having at least one network interface. For example, the electronic device 100 can be (or can be included in): a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a cable modem termination system (such as the cable modem termination system of the present disclosure), a router, a switch, a communication device, an access point, a test device, and/or other electronic devices.

Moreover, any combination of analog and/or digital circuits may be used to implement the circuits and components in the electronic device 100, including: bipolar, PMOS and/or NMOS gates or transistors. In addition, the signals in these embodiments may include digital signals with approximate discrete values and/or analog signals with continuous values. In addition, the components and circuits may be single-ended or differential, and power supplies may be unipolar or bipolar.

Although some operations in the above-mentioned embodiments are implemented by hardware or software, in general, the operations in the above-mentioned embodiments may be implemented in various configurations and frameworks. Therefore, some or all of the operations in the aforementioned embodiments may be implemented by hardware, software, or both. For example, at least some operations in the communication technology can be implemented using the program instruction 122, the operating system 124 (such as a driver for the interface circuit 118), or firmware in the interface circuit 118. Alternatively or additionally, at least some operations in the communication technology may be implemented at physical layer, such as hardware in the interface circuit 118.

Figure 2:
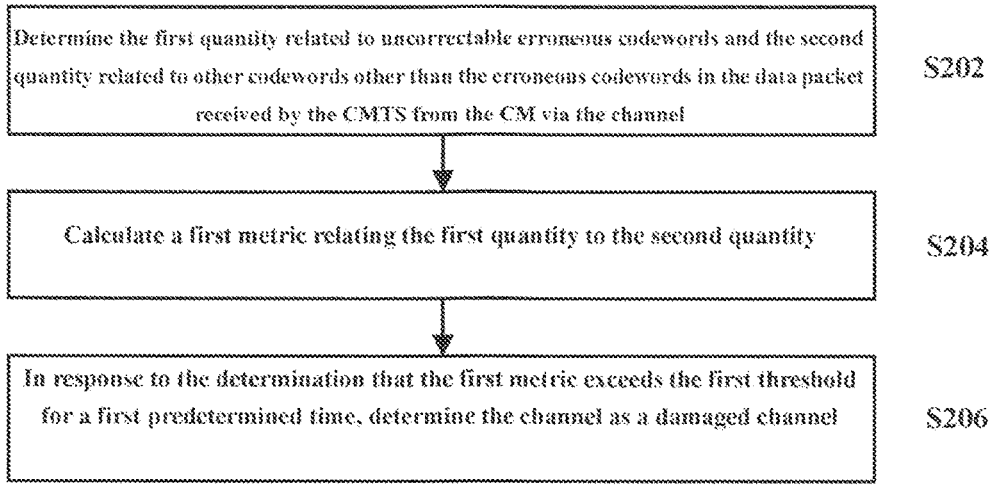
FIG. 2 illustrates an exemplary flowchart of the method for the CMTS according to an embodiment of the present disclosure.

FIG. 2 is a flowchart showing a method 200 for the CMTS according to an embodiment. The method 200 can be implemented by the electronic device 100 described in FIG. 1, wherein each step of the method 200 is executed by the processing subsystem 110 of the electronic device 100.

In addition, FIG. 2 introduces a method for the CMTS according to an embodiment by taking the communication between the CMTS and the CM as an example. It should be understood that the method according to an embodiment of the present disclosure is also applicable to the communication between the CMTS and other terminal devices, wherein other devices include but are not limited to CM-based gateways, Wi-Fi routers, and MTA (multiple terminal access) terminals, as long as they can communicate and transmit data with the CMTS.

As shown in FIG. 2, in step S202, a first quantity related to the uncorrectable erroneous codewords and a second quantity related to other codewords except the erroneous codewords are determined in the data packet received by the CMTS from the CM via the channel.

The "channel" mentioned in step S202 refers to the channel from the CM to the CMTS, that is, the upstream channel. The embodiments of the present disclosure may for applied to OFDMA (Orthogonal Frequency Division Multiplexing with Multiple Access) channel and SC-QAM (Single-Carrier Quadrature Amplitude Modulation) channel, for example. The data packet sent by the CM to the CMTS on the upstream channel may include any data packet that can be sent on the upstream channel, for example, it may include one or a plurality of the following data: management data that the CM sends to the CMTS for establishing a connection in the initialization phase when a communication connection is established between the CMTS and the CM; user data that the CM sends to the CMTS in the operation phase after the communication connection is established; and other data sent from the CM to the CMTS.

In some embodiments, each codeword in the data packet sent by the CM to the CMTS on the upstream channel is generated by the CM's FEC (forward error correction) encoder, and FEC check bits are added to each codeword to indicate whether an error has occurred in the codeword during upstream channel transmission. For example, each codeword can perform bit random mapping including interleaving or scrambling, and includes k data bytes and 2 T parity bytes. A typical 64QAM packet may include, for example, five to eight codewords, each of which may have 100 to 255 bytes.

After receiving a data packet from the CM, the CMTS determines whether the codewords are erroneous codewords according to the FEC check bits in the codewords of the data packet, and corrects the erroneous codewords. For example, if the number of byte errors in an erroneous codeword does not exceed T (that is, half of the parity bytes in the codeword), the FEC decoder in the CMTS can be used to correct the error codeword. Erroneous codewords in such cases are called correctable erroneous codewords. If the number of byte errors in an erroneous codeword exceeds T, the FEC decoder will not be able to correct the erroneous codeword. Erroneous codewords in such cases are called uncorrectable erroneous codewords. In the following, the codeword obtained by correcting the correctable erroneous codeword is sometimes referred to as the correct codeword after error correction processing.

In some cases, the statistical mechanism in the CMTS will continue to count the number of uncorrectable erroneous codewords and the number of correct codewords after error correction processing in the data packets received on each upstream channel. Therefore, in some embodiments, the first quantity related to uncorrectable erroneous codewords in step S202 may be the number of uncorrectable erroneous codewords, and the second quantity related to other codewords except the erroneous codewords may be the number of correct codewords after error correction processing. Thus, the aforementioned statistical mechanism of the CMTS can be used to determine the first quantity and the second quantity.

In addition, it should be understood that those skilled in the art may also, according to requirements, set other quantities related to uncorrectable erroneous codewords as the first quantity, and set other quantities related to other codewords other than the erroneous codewords as the second quantity, as long as a metric relating the first quantity to the second quantity can reflect the proportion of uncorrectable erroneous codewords in the data packet.

Next, in step S204, a first metric relating the first quantity to the second quantity is calculated. In some embodiments, the first metric may be a ratio of the first quantity to the second quantity. In some other embodiments, the first metric may be a ratio of the first quantity to a sum of the first quantity and the second quantity. It should be understood that those skilled in the art may also, according to requirements, designs the first metric in other means, as long as the first metric can reflect a relative magnitude between the first quantity and the second quantity.

The first metric relating the first quantity to the second quantity in a data packet transmitted on a certain upstream channel can reflect the channel quality of the upstream channel to a certain extent. For example, when the first metric relating the first quantity to the second quantity is relatively large, it indicates that there are many uncorrectable erroneous codewords in the data packet transmitted on the upstream channel, and the channel quality of the upstream channel is poor. When the first metric relating the first quantity to the second quantity is relatively small, it indicates that there are few uncorrectable erroneous codewords in the data packet transmitted on the upstream channel, and the channel quality of the upstream channel is good. Therefore, the first metric relating the first quantity to the second quantity can be used to indicate the channel quality, and be used in step S206 to determine the channel status, that is, whether the channel is damaged.

Next, in step S206, the channel is determined to be damaged channel in response to the determination that the first metric relating the first quantity to the second quantity has exceeded the first threshold for a first predetermined time. When the first metric relating the first quantity to the second quantity exceeds the first threshold for a first predetermined time, it can be considered that the channel quality of the upstream channel has been poor (that is, the first metric relating the first quantity to the second quantity exceeds the first threshold) for a prolonged period of time (that is, the first predetermined time), and the channel status of the upstream channel is thus determined as "damaged".

The aforementioned first threshold and first predetermined time may be flexibly set according to actual conditions. In some embodiments, the first threshold may be set as a value between 10% and 80%. In some embodiments, the first threshold may be set as 30%. In some embodiments, the first predetermined time may be set as a value between one second and 3,000 seconds. In some embodiments, the first predetermined time may be further set as a value between 30 seconds and 300 seconds. In some embodiments, the first predetermined time may be set as 60 seconds.

In some embodiments, step S202 and step S204 may be repeated every predetermined interval (e.g., five seconds) to calculate the first metric relating the first quantity to the second quantity, and determine whether the first metric relating the first quantity to the second quantity exceeds the first threshold (e.g., 30%). When all the first metrics relating the first quantity to the second quantity calculated within the first predetermined time (e.g., 60 seconds) exceed the first threshold, it is determined that the first metric relating the first quantity to the second quantity has exceeded the first threshold for the first predetermined time, and the channel is then determined to be a damaged channel in step S206.

According to an embodiment of the present disclosure, the first metric relating the first quantity to the second quantity is used to indicate the channel quality, and it is then confirmed whether the channel should be determined as a damaged channel based on whether the first threshold was exceeded for a first predetermined time with regard to channel quality. In this manner, the channel status can be changed from "available" to "damaged" in time by monitoring the channel quality, thereby reducing the packet loss rate of data packets and increasing the throughput rate of the upstream channel.

Next, an exemplary flowchart of the interaction between a CMTS and a CM according to an embodiment of the present disclosure is described with reference to FIG. 3. In the flowchart, the steps executed by the CMTS may be executed, for example, by the processing subsystem 110 of the electronic device 100.

Figure 3:
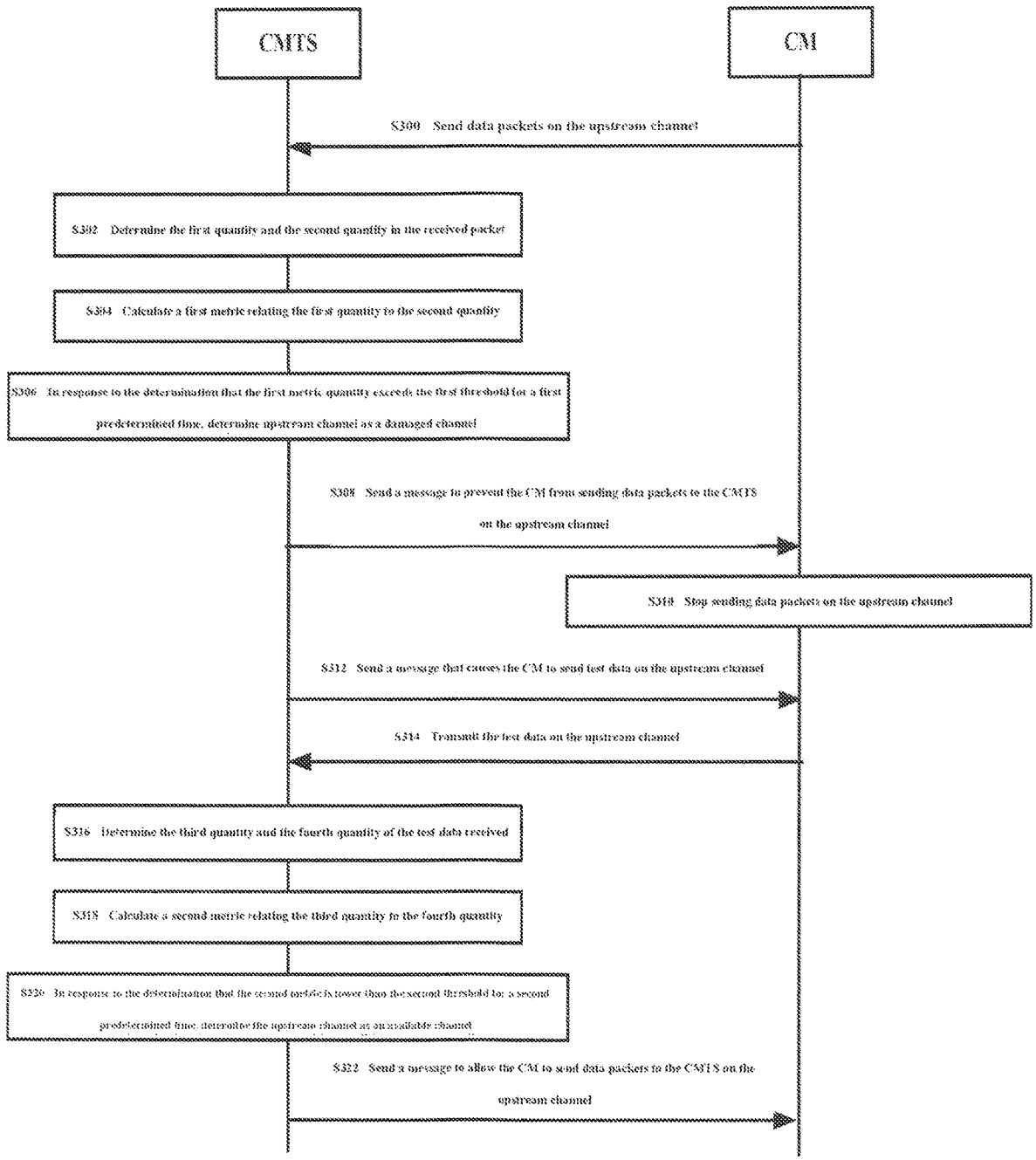
FIG. 3 illustrates an exemplary flowchart of the interaction between the CMTS and the CM according to an embodiment of the present disclosure.

As shown in FIG. 3, in step S300, the CM sends a data packet to the CMTS on the upstream channel.

In step S302, the CMTS determines a first quantity related to uncorrectable erroneous codewords and a second quantity related to other codewords except the erroneous codewords in the data packet received from the CM. For example, the CMTS uses a statistical mechanism to count the number of uncorrectable erroneous codewords $C_1$ and the number of correct codewords after error correction processing $C_2$ in the data packet as the first and second quantities, respectively.

In step S304, the CMTS calculates the first metric relating the first quantity to the second quantity. For example, CMTS calculates the ratio $R_1$ of $C_1$ to $C_2$, that is, $R_1 = C_1/C_2$.

In step S306, the CMTS determines that the upstream channel is a damaged channel in response to the determination that the first metric relating the first quantity to the second quantity exceeds the first threshold for the first predetermined time. For example, when the first threshold is 30% and the first predetermined time is 60 seconds, the upstream channel will be determined as a damaged channel when R>30% for 60 seconds.

The above steps S302 to S306 correspond to the steps S202 to S206, respectively, described above with reference to FIG. 2. For the contents not described in this embodiment, please refer to the embodiment described above with reference to FIG. 2, which will not be repeated here.

In some embodiments, in response to determining that an upstream channel is a damaged channel in step S306, the CMTS may send a message to the CM in step S308 to prevent the CM from sending data packets to the CMTS on the upstream channel.

Next, in step S310, the CM may stop sending data packets on the upstream channel in response to receiving the message. In addition, the CM can avoid the damaged upstream channel and send data packets on other undamaged (available) upstream channels. In this manner, it is possible to prevent the CM from continuing to transmit data on the damaged upstream channel, thereby reducing the packet loss rate of data packets and increasing the throughput of the upstream channel.

The above steps S300 to S310 describe, with reference to FIG. 3, an embodiment in which channel quality is monitored by calculating the proportion of erroneous codewords in the data packet, so as to change the channel status from "available" to "damaged" in time. In some cases, after a certain upstream channel is determined as a damaged channel, the channel quality may also be restored to a better level due to the reduction or elimination of noise, interference, etc., and become suitable for data transmission. In this case, the channel status can be restored from "damaged" to "available" so that the CM can continue to transmit data on the channel.

One method known to the inventor of the present disclosure for restoring a damaged channel to an available channel is to send messages (such as unicast maintenance opportunities) from the CMTS to the CM to try to re-range the channel. If the CM receives the message and sends the RNG-REQ that meets the requirements to the CMTS, and the CM also receives the RNG-RSP returned by the CMTS, the upstream channel can be restored to an available channel.

However, the above process requires multiple messaging interactions between the CMTS and the CM, and the process takes a long time, so it may not be possible to restore the channel status from "damaged" to "available" in time. Differing from the above method, in the present disclosure, the channel quality can be monitored according to the condition of the codewords in the test data transmitted on the damaged upstream channel, so that the channel status can be restored from "damaged" to "available" in time according to the channel quality. The following will be described in detail with reference to steps S312 to S322.

In some embodiments, as shown in FIG. 3, the CMTS sends a message to the CM for the CM to send test data on the upstream channel in step S312. In step S314, the CM sends test data to the CMTS on the upstream channel in response to receiving the message sent in step S312.

In other embodiments, the CM may also automatically send test data to the CMTS on the upstream channel when it knows that the upstream channel is damaged (for example, when it receives the message sent by the CMTS in step S308). In this case, step S312 can be omitted.

Next, in step S316, the CMTS determines the third quantity related to the uncorrectable erroneous test codewords and the fourth quantity related to the test codewords other than the erroneous test codewords in the test data received from the CM As described herein, the statistical mechanism in the CMTS continuously counts the number of uncorrectable erroneous codewords and the number of correct codewords after error correction processing in the data packets received on each upstream channel For test data, CMTS can also count the number of uncorrectable erroneous test codewords and the number of correct test codewords after error correction processing in the received test data.

Therefore, in some embodiments, the above statistical mechanism of the CMTS can be used in step S316 to determine the number of uncorrectable erroneous test codewords $C_3$ and the number of correct test codewords $C_4$ after error correction processing in the test data, respectively, as the third and fourth quantities.

It should be understood that those skilled in the art may also set other quantities related to uncorrectable erroneous test codewords as the third quantity and set other quantities related to test codewords other than the erroneous test codewords as the fourth quantity according to needs, as long as a second metric relating the third quantity to the fourth quantity can reflect the proportion of uncorrectable erroneous test codewords in the test data.

In step S318, the CMTS calculates the second metric relating the third quantity to the fourth quantity. In some embodiments, the second metric may be a ratio of the third quantity to the fourth quantity. In some other embodiments, the second metric may be a ratio of the third quantity to a sum of the third quantity and fourth second quantity. It should be understood that those skilled in the art may also, according to requirements, designs the second metric in other means, as long as the second metric can reflect a relative magnitude between the third quantity and the fourth quantity. For example, CMTS may calculate the ratio $R_2$ of $C_3$ to $C_4$, that is, $R_2 = C_3/C_4$. $R_2$ can reflect the channel quality of the upstream channel to a certain extent, so it can be used in step S320 to determine the channel status, that is, whether it is available.

In step S320, the CMTS determines that the upstream channel is an available channel in response to the determination that the second metric relating the third quantity to the fourth quantity is lower than the second threshold for the second predetermined time. When the second metric relating the third quantity to the fourth quantity is lower than the second threshold for the second predetermined time, it can be considered that the channel quality of the upstream channel has been good (that is, the second metric relating the third quantity to the fourth quantity exceeds the second threshold) for a prolonged period of time (that is, the second predetermined time), and the channel status upstream channel is thus determined as "available".

The above second threshold and second predetermined time may be flexibly set according to actual conditions. In some embodiments, the second threshold may be set as a value no higher than 1%. In some embodiments, the second threshold may be set as 0.1%. In some embodiments, the second predetermined time may be set as a value between one second and 3,000 seconds. In some embodiments, the second predetermined time may be set as 300 seconds.

In some embodiments, step S316 and step S318 may be repeated every predetermined interval (e.g., five seconds) to calculate the second metric relating the third quantity to the fourth quantity, and determine whether the second metric relating the third quantity to the fourth quantity exceeds the second threshold (e.g., 0.1%). When all the second metrics relating the third quantity to the fourth quantity calculated within the second predetermined time (e.g., 300 seconds) are lower than the second threshold, it is determined that the second metric relating the third quantity to the fourth quantity has been lower than the second threshold for the second predetermined time, and the channel is then determined to be an available channel in step S320.

In some embodiments, in step S322, the CMTS sends a message to the CM for allowing the CM to send data packets to the CMTS on the upstream channel.

In this manner, the damaged upstream channel is restored to an available channel, and the CM can continue to send data packets to the CMTS on the channel.

Next, a schematic diagram for the determination of the channel status of an upstream channel according to an embodiment of the present disclosure is described with reference to FIG. 4.

Figure 4:
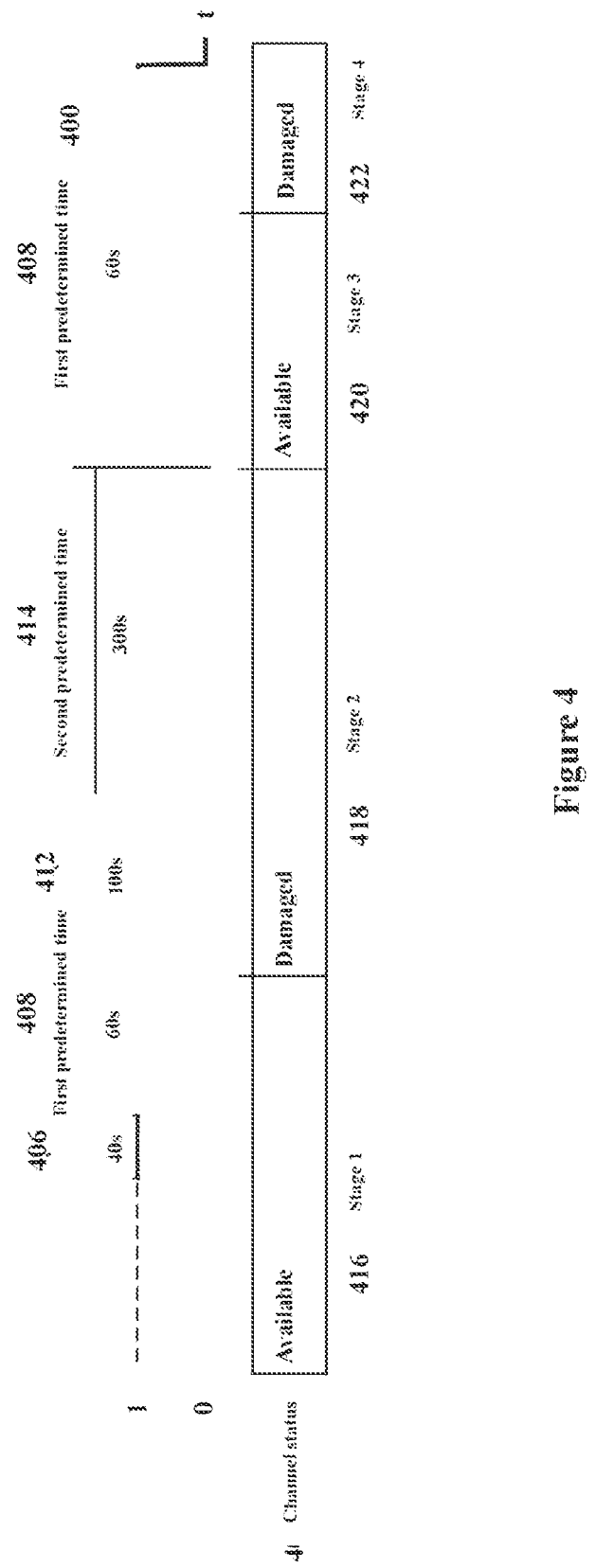
FIG. 4 illustrates a schematic diagram for the determination of the channel status of a certain upstream channel according to an embodiment of the present disclosure.

As shown in FIG. 4, channel status 402 includes "available" and "damaged", and it changes differently with changes in the curve 400 from the first stage 416 to the fourth stage 422. The curve 400 shows the relationship between the ratio $R_1$ of the first quantity to the second quantity calculated in step 304, as well as the ratio $R_2$ of the third quantity to the fourth quantity calculated in step S308, and the threshold value, wherein the horizontal axis represents time t; a value of "1" on the vertical axis indicates that $R_1$ exceeds the first threshold, and a value of "0" on the vertical axis indicates that $R_2$ is lower than the second threshold. In addition, for example, the first predetermined time is set as 60 seconds, and the second predetermined time is 300 seconds. Also, the values "0" and "1" on the vertical axis are only examples, and those skilled in the art can select different values according to the actual situation.

In the first stage 416, the channel status 402 of the current upstream channel is "available". In the time period 406, $R_1$ has exceeded the first threshold for 40 seconds, less than the first predetermined time (60 seconds), so the channel status 402 of the upstream channel remains as "available". Next, $R_1$ has exceeded the first predetermined time 408 (i.e. 60 seconds). At this time, the channel status 402 of the upstream channel changes from available to damaged, and the second stage 418 is entered.

In the time period 412 of the second stage 418, $R_2$ has been lower than the second threshold for 100 seconds, less than the second predetermined time (300 seconds), so the channel status 402 of the upstream channel remains as "damaged". Next, $R_2$ has been lower than the second predetermined time 414 (i.e. 300 seconds). At this time, the channel status 402 of the upstream channel changes from damaged to available, and the third stage 420 is entered.

In the third stage 420, when $R_1$ exceeds the first threshold for the first predetermined time 408 (i.e. 60 seconds), the channel status 402 of the upstream channel changes from "available" to "damaged", and the fourth stage 422 is entered.

According to an embodiment of the present disclosure, the channel quality of the upstream channel is monitored by calculating the proportion of the uncorrectable erroneous codewords in the data packet (or test data) received on the upstream channel, and the channel status of the upstream channel is determined as "damaged" or "available" accordingly. Therefore, the channel status can be adjusted in time in response to the current channel quality, thereby reducing the packet loss rate of data packets, improving the throughput rate of the upstream channel, and improving the efficiency of data transmission.

In some embodiments, the second predetermined time may be set to be greater than the first predetermined time. For example, as shown in FIG. 4, the second predetermined time is 300 seconds, which is greater than the first predetermined time of 60 seconds. The inventor of the present disclosure noticed that if the second predetermined time is set too small, the channel status may only improve temporarily without fully recovering. At this time, if the damaged channel is restored as an available channel, it may quickly become a damaged channel again, and this will cause frequent changes in the channel status between "damaged" and "available", which will affect the stability of the channel. By setting the second predetermined time to be greater than the first predetermined time, the frequent switching of the channel status between "damaged" and "available" due to jitter, noise, etc. can be avoided, and this would result in the channel status being restored to "available" only when the channel status is fully restored, and improve channel stability.

In some embodiments, the first threshold can be set to be higher than the second threshold. In this manner, the channel can be determined as an available channel only when the channel quality is restored to a better condition than when it was determined to be damaged, so as to prevent frequent switching of the channel status between "damaged" and "available" due to jitter, noise, etc., and improve the stability of the channel.

In addition, when a data packet is transmitted on an available upstream channel, the actual proportion of the uncorrectable erroneous codewords included in the data packet can be measured to determine the size of the second threshold. The inventor of the present disclosure found through experiments that the actual proportion is usually a very small value. Therefore, in some embodiments, the second threshold may be set as no higher than 1%. For example, it may be set as 0.1%, so as to further prevent frequent switching of the channel status between "damaged" and "available" due to jitter, noise, etc.

In some embodiments, one or a plurality of parameters used in an embodiment of the present disclosure may be defined in the management information base (MIB). The management information base MIB can specify the variables maintained by the network elements (that is, the information that can be queried and set by the management process), and provide the data structure of the set of all objects that may be managed in the network.

Figure 5:
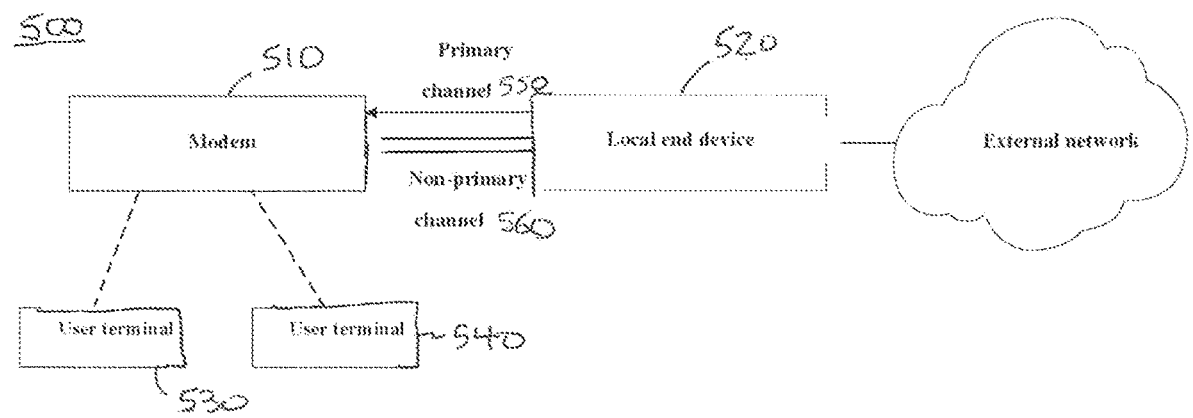
FIG. 5 illustrates a schematic diagram of a network including a modem and a local end device according to an embodiment of the present disclosure.

In some embodiments, the parameters that may be defined in the MIB can include one or a plurality of the following parameters:

cmtsUSChannelbaseCodewordEnable, which is used to indicate whether to enable the function of determining the status of the upstream channel by using erroneous codewords according to the present embodiment;

cmtsUSChannelbaseCodewordImpairedThreshold, which is used to indicate the first threshold, that is, it is a threshold used to determine a channel as a damaged channel;

cmtsUSChannelbaseCodewordImpairedWindow, which is used to indicate the first predetermined time, that is, it is the time window for determining a channel as a damaged channel;

cmtsUSChannelbaseCodewordRecoveryThreshold, which is used to indicate the second threshold, that is, it is the threshold used to determine a channel as an available channel;

cmtsUSChannelbaseCodewordRecoveryWindow, which is used to indicate the second predetermined time, that is, it is the time window for determining a channel as an available channel;

Referring to FIG. 5, a schematic diagram of a network 500 including a modem 510 and a local end device 520 such as a CMTS according to an embodiment of the present disclosure is described. The modem 510 is connected to the local end device 520 through a cable, and the local end device 120 is connected to an external network such as the Internet through an optical fiber, etc. The modem 510 may be a DOCSIS-based modem, and it may include a cable modem-based multimedia adapter (MTA), a gateway, a WiFi gateway, etc. User devices 530 and 540 may be connected to the modem 510 in a wireless manner or a wired manner. The modem 510 sends user data received from the user devices 530 and 540 to a CMTS 520 for transmission to an external network. The local end device 520 sends data received from the external network and destined for the user devices 530 and 540 to the modem 510 for forwarding to the user devices 530 and 540. Although only two user devices are shown in FIG. 5, there may be more user devices. In addition, although only one modem 510 is shown in FIG. 5, the local end device 520 may be connected to a plurality of modems.

In the downlink direction from the local end device 520 to the modem 510, the local end device 520 may transmit data to the modem 510 through a plurality of downlink channels. In each downlink channel, the local end device 520 may send PHY/MAC control messages such as SYNC, MDD, FEC to the modem 510. When the modem 510 can correctly lock (that is, correctly receive and decode) the PHY/MAC control message, the modem 510 determines that the channel quality is good, and continues to receive user data from the local end device 520 via the corresponding downlink channel. When the modem 510 cannot lock the PHY/MAC control message within a long time (that is, the PHY/MAC control message has been lost for a long time), the modem 510 determines that the corresponding channel is damaged. When the downlink channel is damaged, the use of the channel will affect the downstream data throughput.

The plurality of downlink channels between the local end device 520 and the modem 510 may include one primary channel 550 and one or more non-primary channels 560. The data transmitted in the primary channel 550 and the non-primary channel 560 may be modulated by OFDM (Orthogonal Frequency Division Multiplexing), and may also be modulated by SC-QAM (Single-Carrier Quadrature Amplitude Modulation). The primary channel 550 and the non-primary channel 560 occupy different frequency points and do not overlap with each other. When the local end device 520 and the modem 510 establish a connection, the primary channel 550 is first established, then the non-primary channel 560 is established, and management information is only transmitted on the primary channel 550. Both the primary channel 550 and the non-primary channel 560 can be used to transmit user data, for example, data of different parts of a user packet can be simultaneously transmitted.

The modem 510 may be configured using the exemplary structure shown in FIG. 2. Although it is referred to as a modem herein, the modem 510 may be, for example, a hardware electronic device that can combine the functions of a modem, an access point, and/or a router. The present disclosure further proposes that the modem 510 may include, but is not limited to, functions of a smart media device (SMD) or an IP/QAM set top box (STB) that can decode audio/video contents and play contents provided by OTT or MSO.

Figure 6:
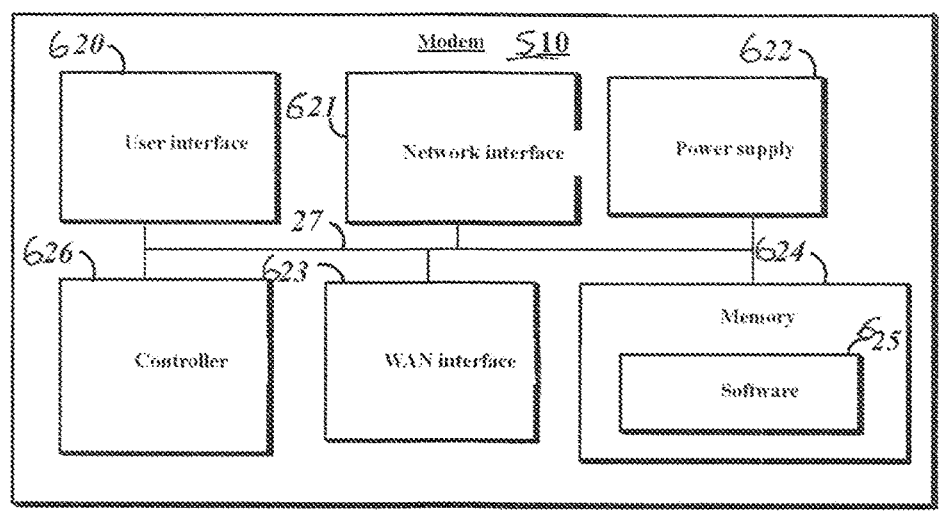
FIG. 6 illustrates an exemplary configuration block diagram of the modem in FIG. 5 according to an embodiment of the present disclosure.

As shown in FIG. 6, the modem 510 may include a user interface 620, a network interface (for example, a LAN interface) 621, a power supply 622, a WAN interface 623, a memory 624, and a controller 626. The user interface 620 may include, but is not limited to, a button, a keyboard, a keypad, LCD, CRT, TFT, LED, HD or other similar display devices, including a display device with a touch screen capability that enables interaction between a user and the modem 510. The network interface 621 may comprise various types of network cards and circuit systems realized by software and/or hardware so as to be able to communicate with a wireless extender device and a client device using one or more wireless protocols. The wireless protocol may be, for example, any IEEE 802.11 Wi-Fi protocol, Bluetooth protocol, Bluetooth Low Energy (BLE) or other short-distance protocols operated in accordance with wireless technology standards to use any licensed or unlicensed frequency band (for example, the Citizen Broadband Radio Service (CBRS) band, 2.4 GHz band, 5 GHz band, or 6 GHz band), RF4CE protocol, ZigBee protocol, Z-Wave protocol, or IEEE 802.15.4 protocol to exchange data over a short distance.

The power supply 622 supplies power to internal components of the modem 510 through an internal bus 627. The power supply 622 may be a self-contained power source such as a battery pack, and it has an interface which is powered by (for example, directly or through other devices) an electrical charger connected to a socket. The power supply 622 may further include a rechargeable battery that is detachable for replacement, for example, NiCd, NiMH, Li ion or Li polymer battery. When the modem 510 is a modem or a gateway device, it may include the WAN interface 623. The WAN interface 623 may include various network cards and circuits realized by software and/or hardware so as to realize the communication between the gateway device and an Internet service provider or a multi-system operator (MSO).

The memory 624 includes a single memory or one or more memories or storage locations, including but not limited to a random access memory (RAM), a dynamic random access memory (DRAM), a static random access memory (SRAM), a read-only memory (ROM), EPROM, EEPROM, ROM, a flash memory, FPGA logic block, a hard disk, or any other layers of a memory hierarchy. The memory 624 may be used to store any type of instructions, software or algorithms, including software 625 for controlling general functions and operations of the modem 510.

The controller 626 controls the general operations of the modem 510 and executes the administrative functions related to other devices in the network (for example, extenders and client devices). The controller 626 may include, but is not limited to, a CPU, a hardware microprocessor, a hardware processor, a multi-core processor, a single-core processor, a microcontroller, an Application-Specific Integrated Circuit (ASIC), a DSP, or other similar processing devices, which can execute any type of instructions, algorithms, or software for controlling the operations and functions of the modem 510 according to the embodiments described in the present disclosure. The processor 626 may include various realizations of a digital circuit system, an analog circuit system, or a mixed signal (combination of analog and digital) circuit system that executes functions in a computing system. The controller 626 may comprise, for example, a circuit such as an integrated circuit (IC), a portion or circuit of a separate processor core, an entire processor core, a separate processor, a programmable hardware device such as a field programmable gate array (FPGA), and/or a system comprising a plurality of processors.

The internal bus 627 may be used to establish communication between the components of the modem 510 (for example, 620 to 622, 624, and 626).

Returning to FIG. 5, due to the influence of channel noise, the PHY/MAC control message may not be lost for a long time but is temporarily lost and then locked by the modem 510, then temporarily lost and locked again, and so on. As a result, the flapping phenomenon occurs.

Figure 7:
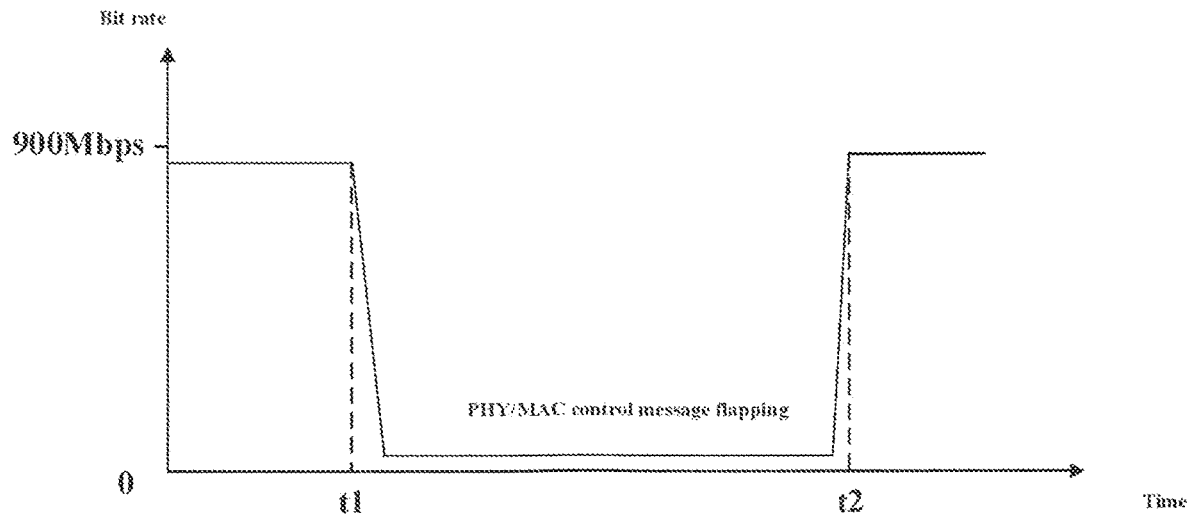
FIG. 7 illustrates a schematic diagram of a change in downstream data throughput when any one PHY/MAC control message flaps in the related art.

The flapping of the PHY/MAC control message will cause the change of the downstream data throughput as shown in FIG. 7. In FIG. 7, the PHY/MAC control message starts flapping from the time t1. Since the modem 510 may be unable to identify the flapping of the PHY/MAC control message, the modem 510 and the local end device 520 cannot know that the corresponding channel is no longer suitable for transmitting user data and will continue transmission on the channel. Incorrect transmission data will be used for decoding together with correct data in other channels, resulting in a rapid decrease in downstream data throughput which will be maintained at a low level. At the time t2, after the flapping phenomenon disappears, the downstream data throughput can return to normal.

Figure 8:
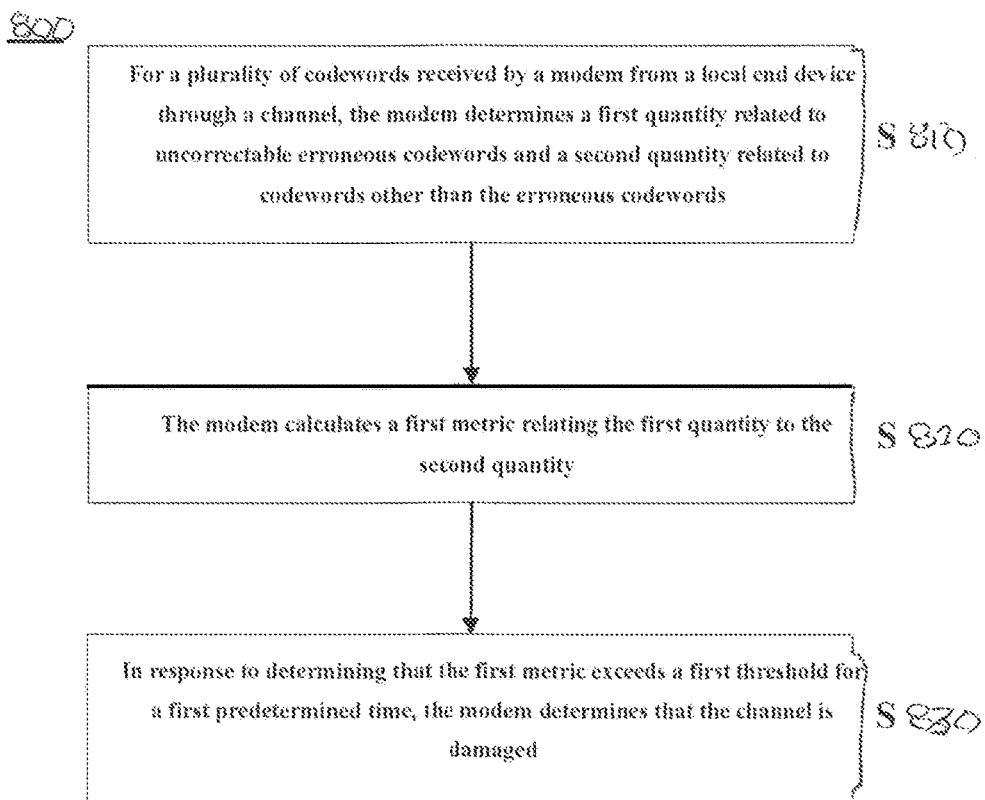
FIG. 8 illustrates a flowchart of a method for detecting a channel state according to an embodiment of the present disclosure.

In order to avoid a serious impact on the downstream data throughput due to the failure to correctly identify the channel state by the modem 510, an embodiment of the present disclosure provides a method 800 shown in FIG. 8 to correctly detect the channel state. The method 800 may be executed by the modem 510.

In S810, for a plurality of codewords received by a modem from a local end device through a channel, the modem determines a first quantity related to uncorrectable erroneous codewords and a second quantity related to codewords other than the erroneous codewords.

For all the codewords received by the modem 510 from the local end device 520 via a certain channel (hereinafter represented by channel A) within a predetermined time (for example, 10 seconds, 30 seconds, 60 seconds, etc.), a first quantity related to uncorrectable erroneous codewords among these codewords may be determined, and a second quantity related to codewords other than the uncorrectable erroneous codewords among these codewords may also be determined.

For example, the first quantity may be the number of uncorrectable erroneous codewords, and the second quantity may be the number of correct codewords. Correct codewords include codewords that have no errors and codewords that can be corrected correctly after error correction processing of the modem. In an embodiment of the present disclosure, the first quantity is used to characterize the quantity information of uncorrectable erroneous codewords, and the second quantity is used to characterize the quantity information of correct codewords. For example, the modem may count the codewords it receives from the local end device 520 via channel A within 10 seconds. Assume there are 500 in total. After the error correction processing, there are 100 uncorrectable erroneous codewords, and thus there are 400 correct codewords. The first quantity may be equal to 100, and the second quantity may be equal to 400.

A time window with a certain length of time for counting the number of codewords can be slid as time passes to include new codewords received from the local end device 520 via the channel A each time the first quantity and the second quantity are determined. The size of the time window may be fixed or variable, as long as different codewords are included in the process of two consecutive determinations of the first quantity and the second quantity.

In S820, the modem calculates a first metric relating the first quantity to the second quantity.

Each time after determining the first quantity and the second quantity based on the codewords received within the time window, the modem 510 may calculate a ratio of the first quantity to the second quantity as the first metric, i.e., "first metric=first quantity/second quantity", or the modem 510 may calculate a ratio of the first quantity to a sum of the first quantity and the second quantity as the first metric, i.e., "first metric=first quantity/(first metric+second quantity)". More specifically, "first metric=number of uncorrectable erroneous codewords/number of correct codewords", or "first metric=number of uncorrectable erroneous codewords/total number of codewords".

In S830, in response to determining that the first metric exceeds a first threshold for a first predetermined time, the modem determines that the channel is damaged.

Since the modem 510 can consecutively determine the first quantity and the second quantity of codewords received via the channel A in the corresponding time window as time passes, and can calculate the metric R1 relating the first quantity to the second quantity, the modem can obtain a series of metrics R1 as time passes. If the metric R1 is kept exceeding the first threshold Th1 within the first predetermined time T1, then it can be determined that there are relatively more uncorrectable erroneous codewords. Thus, the channel A has poor quality and is no longer suitable for transmitting user data. As a result, the modem 110 determines that the channel state of the channel A is a damaged state.

In the method 800, by introducing a first quantity such as the number of uncorrectable erroneous codewords and a second quantity such as the number of correct codewords after error correction processing or the total number of codewords, it is possible to use the first metric relating the first quantity to the second quantity to help the determination of the channel state. When the first metric relating the first quantity to the second quantity counted by the modem in chronological order is kept exceeding the first threshold within the first predetermined time, the modem can determine that the channel is damaged, thereby avoiding the problem of being unable to know the channel state in all situations as in the related art, which can further be advantageous for the modem to perform more appropriate operations based on the channel state.

According to an embodiment of the present disclosure, after the modem 510 determines that the channel A is damaged, the modem 510 may directly send a message to the local end device trough a normal uplink channel to prevent the local end device 520 from sending user data on the channel A. Alternatively, the modem 510 may also send such a message to the user device 530 or 540, the user device 530 or 540 sends the message to other devices connected to the local end device 520 (for example, other modems or gateway devices connected to the local end device 520), and the other devices further send the message to the local end device 520. After receiving the message, the local end device 520 determines that the channel A indicated by the message is damaged, and then stops sending downstream data on the channel A.

Only the use of the damaged downlink channel is stopped while other normal downlink channels are still in use. Therefore, although the amount of data sent by the local end device 120 through all the channels between the local end device and the modem 510 per unit time is reduced, compared with the case of continuing to use the damaged channel with poor quality to transmit data, the transmission efficiency of the packet data is increased because the fragmented data that need to be decoded together to obtain the packet data are basically correct. vAs a result, the downstream data throughput is improved and can be maintained at a high level.

According to an embodiment of the present disclosure, in response to determining that the channel A is damaged in S830, the modem 510 may add the channel A to a blacklist to avoid using the channel A as a primary channel.

Since the primary channel transmits management information for managing the modem 510, this channel is an important channel for maintaining the normal connection between the modem 510 and the local end device 520. When it is determined that the channel A is damaged, it means that the frequency point corresponding to the channel A is susceptible to strong interference in the current environment and is not suitable for use as the primary channel. Therefore, the information of the channel A may be added to the blacklist to avoid using the frequency point corresponding to the channel A as the primary channel, thereby improving the success rate and stability of the subsequent connection process between the modem 510 and the local end device 520.

The damaged channel A may be the primary channel. In this case, in response to determining that the channel A is damaged, the modem 510 may re-establish a connection between the local end device 520 and the modem 510. For example, the modem 510 may execute a reinit-mac operation to reinitialize the MAC (medium access control) module, thereby triggering the modem 510 to rescan the frequency points to lock the frequency. In the process of the modem 510 rescanning available frequency points, the modem 510 may prevent the frequency point corresponding to the channel A from being used as a channel, and in particular, prevent the frequency point corresponding to the channel A from being used as the primary channel. Of course, the modem 510 may also re-establish the connection by restarting itself. Compared with the restart operation, the reinit-mac operation takes less time and the connection is recovered faster.

The damaged channel A may also be a non-primary channel. Since the non-primary channel is used to transmit user data, the consequence of its damage is less serious than the consequence of the damage of the primary channel which needs to transmit management information. Therefore, after the non-primary channel is damaged, the modem 510 may wait for the damaged non-primary channel to recover without executing the reinit-mac or restart operation. It can be detected whether the non-primary channel is recovered by the method 900 shown in FIG. 9.

In S910, for a plurality of test codewords received by a modem from a local end device through a damaged channel, the modem determines a third quantity related to uncorrectable erroneous test codewords and a fourth quantity related to test codewords other than the erroneous test codeword.

Although the downlink channel A is in a damaged state, the downlink channel A still exists. On this channel, the local end device 520 may proactively send test data to the modem 510 to test whether the channel A can transmit data correctly. The test data for testing the channel A may be randomly generated, or may be data or a part of the data being sent by other channels, or may be predetermined data designed in advance, etc. It may be sent by the local end device 520 periodically or continuously.

Similar to S810, the modem 510 may count, in all the test codewords received from the local end device 520 via the channel A within a predetermined time, a third quantity related to uncorrectable erroneous test codewords and a fourth quantity related to correct test codewords after error correction processing. The predetermined time may be fixed or variable. Moreover, the predetermined time may be equal to the predetermined time in S810, or may be greater than the predetermined time in S810, for example, 1 minute, 3 minutes, 8 minutes, etc. The third quantity may be the number of uncorrectable erroneous test codewords, and the fourth quantity may be the number of correct test codewords after error correction processing.

For example, after determining that the channel A is damaged, the modem 510 may prevent the local end device 520 from continuing to send user data on the channel A. Although the local end device 520 cannot continue to send user data on the channel A, the local end device 520 can send a small amount of test data on the channel A for testing the channel quality. The modem 510 may determine the number of codewords received from the local end device 520 via the channel A within the time window for counting the test codewords, for example, determine that a total of 50 codewords are received within 3 minutes. After the error correction processing by the modem 510, the modem 510 determines that there are 5 uncorrectable erroneous codewords, and thus there are 45 correct codewords. As a result, it can be determined that the third quantity is equal to 5 and the fourth quantity is equal to 45.

In S920, the modem calculates a second metric relating the third quantity to the fourth quantity.

Each time after determining the third quantity and the fourth quantity based on the codewords received within the time window for counting test codewords, the modem 110 may calculate a ratio of the third quantity to the fourth quantity as the second metric, i.e., "second metric=third quantity/fourth quantity", or the modem 110 may calculate a ratio of the third quantity to a sum of the third quantity and the fourth quantity as the second metric, i.e., "second metric=third quantity/(third metric+fourth quantity)". More specifically, "second metric=number of uncorrectable erroneous test codewords/number of correct test codewords", or "second metric=number of uncorrectable erroneous test codewords/total number of test codewords".

In S930, in response to determining that the second metric is lower than a second threshold for a second predetermined time, the modem determines that the damaged channel is recovered to be usable.

Since the modem 510 can consecutively determine the third quantity and the fourth quantity of codewords received via the channel A in the time window for counting test codewords as time passes, and can calculate the metric R2 of the third quantity to the fourth quantity, the modem 510 can obtain a series of metrics R2 as time passes. If the metric R2 is kept lower than the second threshold Th2 within the second predetermined time T2, then it can be determined that there are relatively more correct test codewords. Thus, the channel has good quality and is suitable for transmitting user data. As a result, the modem 510 determines that the channel A is recovered to be usable.

The second predetermined time T2 in S930 and the first predetermined time T1 in S830 may be the same or different. Preferably, the second predetermined time T2 is greater than the first predetermined time T1, the first threshold Th1 is higher than the second threshold Th2, and the second threshold Th2 is 2% or lower. In this way, it is possible to prevent the channel state from being switched back and forth between the damaged state and the usable state due to the influence of jitter noise, and at the same time to ensure that the damaged channel is recovered to be usable only when the quality of the channel becomes good enough. This further ensures the correct transmission of data and improves the downstream data throughput more reliably.

The parameters T1, T2, Th1, and Th2 may be flexibly set according to needs. For example, T1 may be set in the range of 10 seconds to 2 minutes, and its default value may be 60 seconds; T2 may be set in the range of 2 minutes to 10 minutes, and its default value may be 300 seconds; Th1 may be set in the range of 10% to 50%, and its default value may be 30%; Th2 may be set in the range of 0.01% to 2%, and its default value may be 0.1%. The values of these parameters may be set by the modem 510 by automatically reading a configuration file when it is started, or may be set by an administrator through remote control, for example, via MIB (Management Information Base) messages. Similarly, the time window for counting the number of codewords may also be set flexibly according to needs. For example, the time windows for counting in S810 and S910 are both 20 seconds.

Figure 10:
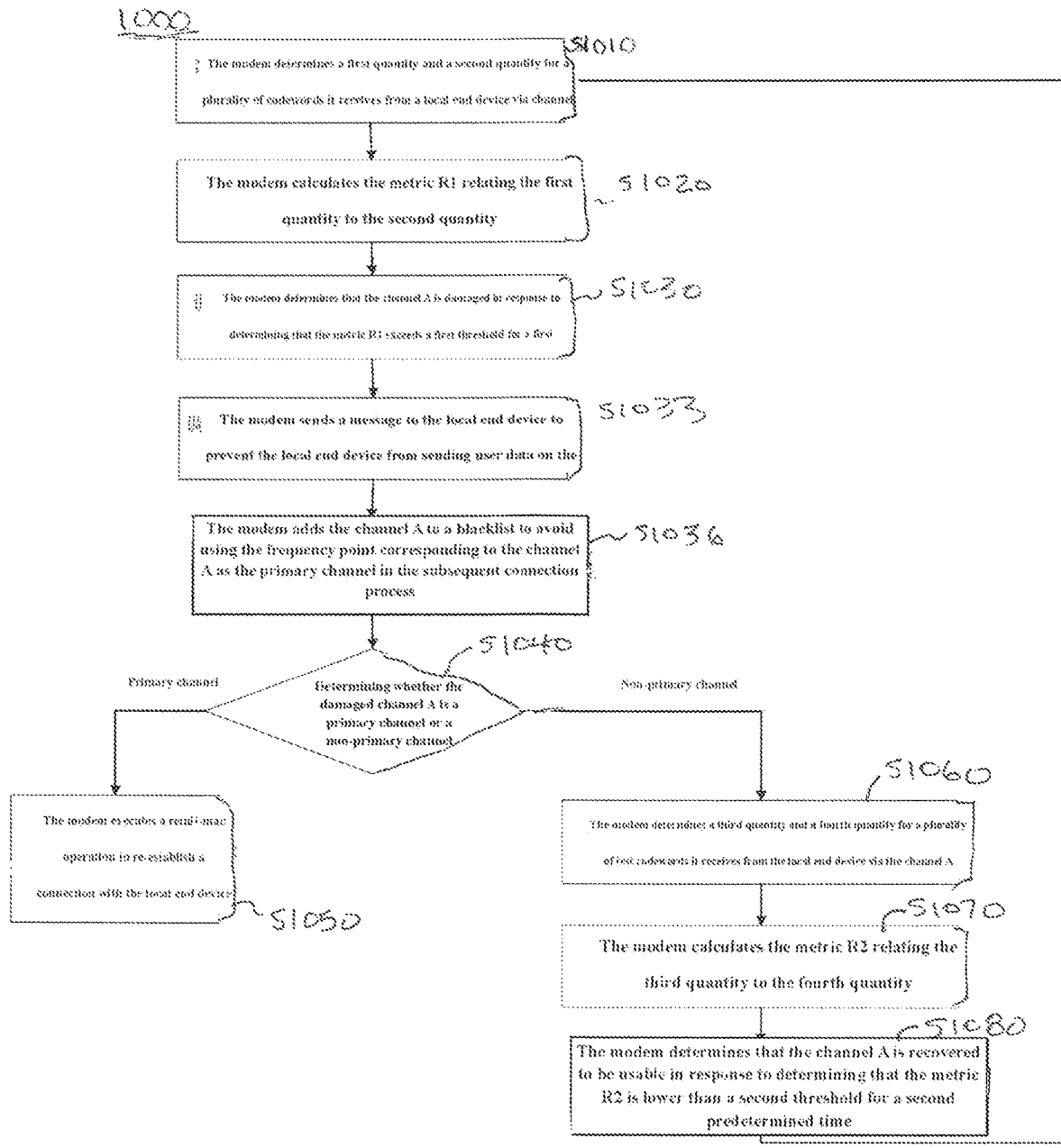
FIG. 10 illustrates another flowchart of a method for detecting a channel state according to an embodiment of the present disclosure.

FIG. 10 shows a flowchart of an exemplary method 1000 for detecting a channel state according to an embodiment of the present disclosure.

In S1010, the modem 510 determines the number of uncorrectable erroneous codewords (as the first quantity) and the number of correct codewords (as the second quantity) for a plurality of codewords it receives from the local end device 520 via the channel A. This step is basically the same as S810.

In S1020, the modem 510 calculates the metric R1 of the first quantity to the second quantity in S1010. This step is basically the same as S820.

In S1030, the modem 510 determines that the channel A is damaged in response to determining that the metric R1 exceeds the first threshold Th1 for the first predetermined time T1. This step is basically the same as S830.

In S1033, the modem 510 sends a message to the local end device 520 to prevent the local end device from sending user data on the channel A.

In S1036, the modem 510 adds the channel A in the blacklist to avoid using the frequency point corresponding to the channel A as a primary channel in the subsequent connection process.

Although S1033 is executed before S1036 in the above description, S1033 may also be executed after S1036, or S1033 may be executed in parallel with S1036.

In S1040, the modem 510 determines whether the damaged channel A is a primary channel or a non-primary channel.

In the case where it is determined that the damaged channel A is a primary channel, the method 1000 proceeds to S1050. In the case where it is determined that the damaged channel A is a non-primary channel, the method 1000 proceeds to S1060.

In S1050, the modem 510 executes the reinit-mac operation to re-establish a connection with the local end device 520.

In S1060, the modem 510 determines the number of uncorrectable erroneous test codewords (as the third quantity) and the number of correct test codewords (as the fourth quantity) for a plurality of test codewords it receives from the local end device 520 via the damaged channel A. This step is basically the same as S910.

In S1070, the modem 510 calculates the metric R2 of the third quantity to the fourth quantity. This step is basically the same as S920.

In S1080, in response to determining that the metric R2 is lower than the second threshold Th2 for the second predetermined time T2, the modem 510 determines that the damaged channel A is recovered to be usable. This step is basically the same as S930.

Then, the method 1000 returns to S1010 to continue to monitor the state of the recovered channel A.

FIG. 11 shows a schematic diagram of using the method 1000 to detect the state of the channel A taking T1=60 seconds, T2=300 seconds, Th1=30%, and Th2=0.1% as an example.

At first, the channel A is in a usable state, and the local end device 520 uses the channel A to send downlink data to the modem 510. The modem obtains a series of metrics R1 according to steps S1010 and S1020. The modem determines that R1 has been lower than Th2 during t1 to t2, exceeds Th1 in the 40 seconds from t2 to t3, and drops below Th2 again until t4. Since the duration of t2 to t3 fails to reach T1, the channel state remains unchanged.

Next, the modem determines that R1 starts to exceed Th1 from t4 according to a series of metrics R1 obtained in steps S1010 and S1020. When R1 exceeds Th1 for a duration of T1 to reach t5, the modem determines that the channel state is a damaged state. Since the channel A in this example is a non-primary channel, the modem keeps the channel A and starts to test whether the channel A is recovered to be usable.

Next, the modem obtains a series of metrics R2 according to steps S1060 and S1070. The modem determines that R2 has been above Th1 from t5 to t6, falls below Th2 in the 100 seconds from t6 to t7, and exceeds Th1 again. Since the duration of t6 to t7 fails to reach T2, the channel state remains unchanged.

Next, R2 exceeds Th1 during t7 to t8 and is lower than Th2 from t8. When it keeps being lower than Th2 for a duration of time T2 to reach t9, the modem determines that the channel state is recovered to a usable state.

Next, the modem obtains a series of metrics R1 according to steps S1010 and S1020. R1 remains lower than Th2 from t9 to t10, and exceeds Th1 from t10. Then, if R1 exceeds Th1 for a length of time T1, the channel state switches to the damaged state again.

According to the above technical solutions, by using the relation between the first metric relating the first quantity to the second quantity as well as the second metric relating the third quantity to the fourth quantity and the threshold within a predetermined time, it is possible to correctly determine the channel state, thereby avoiding the problem that the related art cannot correctly identify the channel state. By correctly identifying the channel state, the modem can further perform appropriate operations to deal with the problem of the damages channel, which is further helpful in improving the downstream data throughput.

The system may be realized as any combination of devices, systems, integrated circuits, and computer programs on non-transitory computer-readable media. One or a plurality of processors can be realized as an integrated circuit (IC), an application specific integrated circuit (ASIC) or a large-scale integrated circuit (LSI), a system LSI, or a super LSI or super LSI component that performs part or all of the functions described in the present disclosure.

The system may include the use of software, applications, computer programs, or algorithms. Software, application programs, computer programs or algorithms can be stored on a non-transient computer-readable medium, so that a computer with one or a plurality of processors can execute the aforementioned steps and the steps described in the attached drawings. For example, software or an algorithm with executable instructions may be stored on one or a plurality of memories, and one or a plurality of processors may be associated with a set of instructions for executing the software or algorithm so as to provide various functions of the cable modem termination system according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

In addition, in the description of the present disclosure, the terms "first", "second", "third" and "fourth" are used only for descriptive purposes and should not be understood to indicate or imply relative importance and order.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A cable modem termination system, comprising:
   a memory, on which instructions are stored; and
   a processor configured to execute instructions stored on the memory to execute at least the following processing:
   determining a first quantity related to uncorrectable erroneous codewords and a second quantity related to other codewords except the erroneous codewords in the data packet received by the cable modem termination system from the terminal device via a channel;

calculating a first metric relating the first quantity to the second quantity; and in response to the first metric exceeding a first threshold for a first predetermined time, determining the channel as a damaged channel;

wherein the processor is further configured to execute instructions stored on the memory to perform at least the following processing:

determining a third quantity related to uncorrectable erroneous test codewords and a fourth quantity related to other test codewords except the erroneous test codewords in the test data received by the cable modem termination system from the terminal device via the channel;

calculating a second metric relating the third quantity to the fourth quantity; and in response to the second metric being lower than a second threshold for a second predetermined time, determining the channel as an available channel, wherein the first threshold is higher than the second threshold, and the second threshold is no higher than 1%.

2. The cable modem termination system according to claim 1, wherein the processor is further configured to execute instructions stored on the memory to perform at least the following processing:

in response to the determination that the channel is a damaged channel, send a message to the terminal device for causing the terminal device to send test data on the channel.

3. The cable modem termination system according to claim 1, wherein the third quantity related to uncorrectable erroneous test codewords is the number of uncorrectable erroneous test codewords, and the fourth quantity related to test codewords other than the erroneous test codewords is the number of correct test codewords after error correction processing, the second metric is a ratio of the third quantity to the fourth quantity or a ratio of the third quantity to a sum of the third quantity and the fourth quantity.

4. The cable modem termination system according to claim 1, wherein the second predetermined time is greater than the first predetermined time.

5. The cable modem termination system according to claim 1, wherein at least one of the first threshold, the second threshold, the first predetermined time, and the second predetermined time is defined in a management information base (MIB).

6. A modem, including:

a memory, in which an instruction is stored; and a processor, configured to execute the instruction stored in the memory to cause the modem to execute the following operations:

for a plurality of codewords received by the modem from a local end device through a channel, determining a first quantity related to uncorrectable erroneous codewords and a second quantity related to codewords other than the erroneous codewords;

calculating a first metric relating the first quantity to the second quantity; and determining that the channel is damaged in response to determining that the first metric exceeds a first threshold for a first predetermined time;

wherein, the processor is further configured to execute the instruction stored in the memory to cause the modem to execute the following operations:

when the channel is not the channel through which the local end device transmits management information for managing the modem, for a plurality of test codewords received by the modem from a local end device through the channel, determining a third quantity related to uncorrectable erroneous test codewords and a fourth quantity related to test codewords other than the erroneous test codewords;

calculating a second metric relating the third quantity to the fourth quantity; and determining that the channel is usable in response to determining that the second metric is lower than a second threshold for a second predetermined time, wherein, the second predetermined time is greater than the first predetermined time, the first threshold is higher than the second threshold, and the second threshold is 2% or lower.

* * * * *